(12) United States Patent
Donderici et al.

(10) Patent No.: US 10,132,955 B2
(45) Date of Patent: Nov. 20, 2018

(54) FIBER OPTIC ARRAY APPARATUS, SYSTEMS, AND METHODS

(71) Applicant: Halliburton Energy Services, Inc., Houston, TX (US)

(72) Inventors: Burkay Donderici, Houston, TX (US); Reza Khalaj Amineh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/120,473

(22) PCT Filed: Mar. 23, 2015

(86) PCT No.: PCT/US2015/020016
§ 371 (c)(1),
(2) Date: Aug. 19, 2016

(87) PCT Pub. No.: WO2016/153475
PCT Pub. Date: Sep. 29, 2016

(65) Prior Publication Data
US 2017/0068016 A1 Mar. 9, 2017

(51) Int. Cl.
| | |
|---|---|
| *E21B 47/10* | (2012.01) |
| *G01V 1/24* | (2006.01) |
| *G01V 3/30* | (2006.01) |
| *G01L 1/24* | (2006.01) |
| *E21B 47/09* | (2012.01) |
| *E21B 49/00* | (2006.01) |

(52) U.S. Cl.
CPC ............ *G01V 3/30* (2013.01); *E21B 47/0905* (2013.01); *E21B 47/10* (2013.01); *E21B 49/00* (2013.01); *G01L 1/24* (2013.01)

(58) Field of Classification Search
CPC ...... E21B 47/10; E21B 47/102; E21B 47/123; E21B 47/0905; G01V 3/30
See application file for complete search history.

(56) References Cited

U.S. PATENT DOCUMENTS

| | | | |
|---|---|---|---|
| 5,661,237 A | * | 8/1997 | Dussan V. |
| 5,872,876 A | | 2/1999 | Kluth et al. |
| 6,112,809 A | | 9/2000 | Angle |
| 6,296,066 B1 | | 10/2001 | Terry et al. |
| 6,655,188 B2 | | 12/2003 | Knudsen et al. |

(Continued)

OTHER PUBLICATIONS

"International Application Serial No. PCT/US2015/022016, International Search Report dated Nov. 6, 2015", 3 pgs.

(Continued)

*Primary Examiner* — Cathleen R Hutchins
(74) *Attorney, Agent, or Firm* — Gilliam IP PLLC

(57) ABSTRACT

In some embodiments, an apparatus and a system, as well as a method and article of manufacture, may operate to receive sensor information from a series of sensors coupled to a spiral-shaped optical fiber, wherein the sensor information comprises a signal integrating at least a location of one or more of the sensors along the optical fiber, and a physical parameter measurement. Further activity may include determining a physical property of material in a geological formation based on the physical parameter measurement. Additional apparatus, systems, and methods are disclosed.

22 Claims, 10 Drawing Sheets

(56) References Cited

U.S. PATENT DOCUMENTS

| | | |
|---|---|---|
| 6,817,257 B2 | 11/2004 | Kluth |
| 7,617,873 B2 | 11/2009 | Lovell et al. |
| 8,479,841 B2 | 7/2013 | Rosten |
| 8,755,643 B2 | 6/2014 | Nash et al. |
| 2001/0023614 A1 | 9/2001 | Tubel et al. |
| 2002/0121371 A1* | 9/2002 | Moake |
| 2002/0196993 A1 | 12/2002 | Schroeder |
| 2003/0184299 A1 | 10/2003 | Strack |
| 2006/0065393 A1 | 3/2006 | Williams et al. |
| 2006/0146337 A1 | 7/2006 | Hartog |
| 2007/0126594 A1 | 6/2007 | Atkinson et al. |
| 2008/0066960 A1 | 3/2008 | Mathiszik et al. |
| 2008/0142212 A1* | 6/2008 | Hartog |
| 2009/0199630 A1 | 8/2009 | DiFoggio et al. |
| 2010/0218944 A1 | 9/2010 | Quigley et al. |
| 2010/9229324 | 9/2010 | Csutak |
| 2011/0098931 A1 | 4/2011 | Kosmala et al. |
| 2012/0175513 A1 | 7/2012 | Duncan et al. |
| 2013/0087328 A1 | 4/2013 | Maida, Jr. et al. |
| 2013/0105148 A1 | 5/2013 | Coats et al. |
| 2014/0222343 A1 | 8/2014 | Samson et al. |

OTHER PUBLICATIONS

"International Application Serial No. PCT/US2015/022016, Written Opinion dated Nov. 6, 2015", 12 pgs.

\* cited by examiner

10,132,955 B2

FIBER OPTIC ARRAY APPARATUS, SYSTEMS, AND METHODS

PRIORITY APPLICATIONS

This application is a U.S. National Stage Filing under 35 U.S.C. § 371 from International Application No. PCT/US2015/022016, filed on 23 Mar. 2015, which application is incorporated herein by reference in its entirety.

BACKGROUND

Understanding the structure and properties of geological formations can reduce the cost of drilling wells for oil and gas exploration.

Measurements made in a borehole (i.e., downhole measurements) are typically performed to attain this understanding, to identify the composition and distribution of material that surrounds the measurement device downhole.

In wireline logging, the measuring devices attached to a sonde are lowered and retrieved from the borehole by an armored cable that provides electrical power and a pathway for transferring acquired data to the surface. Alternatively, in logging-while-drilling (LWD), the measurement sensors are placed close to the bit, providing information to drillers and geologists at the surface via telemetry.

Many sensors in wireline logging and LWD operate using electromagnetic (EM) principles. In some reservoirs, the desired detail in formation evaluation is provided with borehole imaging tools. For example, in so-called dipmeter tools, small electrodes are mounted on several pads placed at various circumferential positions to provide image data from around the borehole. Dipmeter processing is employed for a quick determination of structural dip, and for locating and orienting structural events. With such information, a more comprehensive seismic interpretation is subsequently performed. However, due to the size limitations of EM sensors and electrodes, full circumferential coverage of the borehole using a dipmeter tool is usually not practical.

DETAILED DESCRIPTION

EM sensing provides continuous, in situ measurements of parameters related to porosity, lithology, hydrocarbon presence, and casing integrity, among others. As a result, there has been considerable interest in using EM in borehole monitoring applications. Dipmeters have been used in an attempt to increase azimuthal coverage, however none of the commercially available tools provide an indication of azimuthal direction, in combination with full (100%) borehole coverage. Fiber optic sensing technology has also been implemented in a basic way (e.g., for temperature monitoring), but the use of such sensors to measure electromagnetic properties and resistivity at other than shallow depths (e.g., proximate to the surface of the borehole wall) have been frustrated, due to high attenuation.

To address some of these challenges, as well as others, apparatus, systems, and methods are described herein that provide a compact mechanism for sensing formation properties within a borehole, with an integral indication of azimuthal direction. Many embodiments take the form of a fiber optic spiral, with a sensor array that follows the spiral path. As a result, full-coverage borehole imaging can be provided in a practical manner, at a reasonable cost. The details of various embodiments will now be described.

Fundamental Concepts

Figure 1:
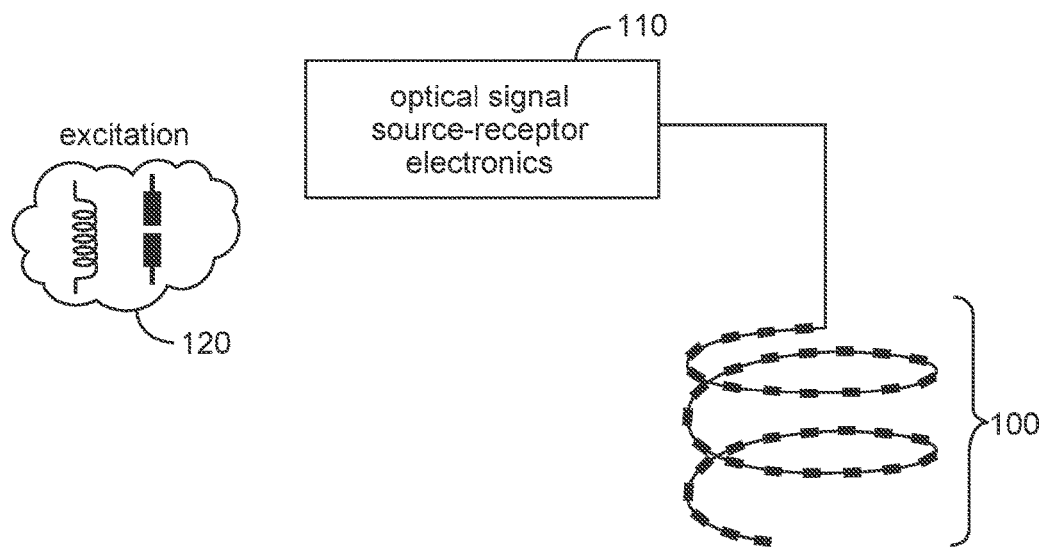
FIG. 1 is a block diagram of optical signal source-receptor electronics and fiber optic cable assembly in accordance with various embodiments of the invention.

FIG. 1 is a block diagram of optical signal source-receptor electronics 110 and a fiber optic cable assembly 100 in accordance with various embodiments of the invention. Here the cable assembly 100 is shown being optically coupled to optical signal source-receptor electronics 110. Excitation sources 120 may comprise EM sources (e.g., coils) and/or electrodes (e.g., current injection and reception electrodes).

Figure 2:
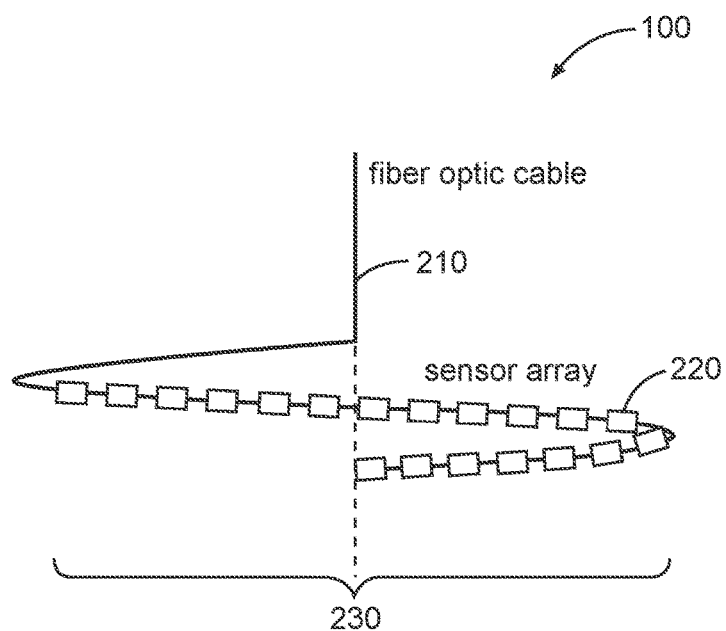
FIG. 2 is a more detailed block diagram of a cable assembly, including a spiral fiber optic cable and sensors, in accordance with various embodiments of the invention.

FIG. 2 is a more detailed block diagram of a cable assembly 100, including a spiral fiber optic cable 210 and sensors 220, in accordance with various embodiments of the invention. As illustrated in the figure, fiber optic-based sensors 220, such as EM sensors, are distributed along the spiral path that forms a helix 230 of the fiber optic cable 210, linking the sensors 220 to each other, as well as to the optical signal-receptor electronics 110 (see FIG. 1). The fiber optic cable 210 also serves as the communication link with the surface.

The fiber optic cable 210 can be modified locally to create sensitivity to EM fields. In this way, the easily-deployed fiber optic sensors 220 can be used to reduce the amount of equipment downhole. For example, a portion of the fiber optic cable 210 can be configured to operate as a magnetic dipole or an electric dipole with an axis of sensitivity along the longitudinal axis of the cable 210, or in any desired direction. In some embodiments, the output of such EM sensors may be mechanically coupled to the cable 210 to modify radiation carried within the fiber channel.

For example, a sensor 220 may be operable to determine a chemical concentration, a pH value, a temperature, a pressure, or a magnitude of EM radiation along a desired direction. Actuator electronics can be coupled to the sensor 220 to generate a signal corresponding to the parameter of interest, in response to the measurement by the sensor 220. In turn, the actuator electronics may be coupled to an actuator, such as a diaphragm, to generate a perturbation, based on the magnitude of the received signal, to the fiber optic cable 210. Thus, the actuator, perhaps comprising piezoelectric material or a voice coil, can be placed in proximity to the fiber optic cable 210, to provide acoustic pressure to the fiber optic cable 210, or to transfer vibrations by direct contact. The resulting vibration of the cable 210, or a strain induced into the cable 210, alters the propagation of light in the cable 210. In this way, analysis of the affected light propagation can provide data with respect to the signal that generates the perturbation (e.g., the measurement signal provided by the sensor 220).

Thus, referring now to FIGS. 1 and 2, it can be seen that the source-receptor electronics 110 may operate to inject a short pulse into the fiber optic cable 210 (e.g., 20 nanoseconds long). As the pulse travels down the cable 210, backscattered light is generated. To interrogate a location that is one kilometer down the cable 210, backscattered light is received after the amount of time it takes to travel one kilometer and then return, a round trip time of about ten nanoseconds per meter. As is known to those of ordinary skill in the art, the electronics 110 can include circuitry that is structured to measure frequency based on coherent Rayleigh scattering using interferometry, to measure dynamic changes in attenuation, or a dynamic shift of the Brilliuon frequency, or combinations thereof. In this way, signals from the sensors 220 can be translated into perturbations of the cable 210, which in turn transform the sensor measurement values into changes in the backscattered light carried by the cable 210, and received by the electronics 110.

The fiber optic-based sensors 220 can be employed in wireline logging or LWD operations. As a function of signal travel time, in addition to carrying sensor measurement information, the signals received from the fiber optic cable 210 can be used to precisely locate each sensor 220 along the cable 210. This simplifies sensor deployment.

When the assembly 100 is employed as part of wireline logging operations, a sonde moving in the longitudinal direction of the borehole provides continuous sampling of the formation properties along the axial direction. Azimuthal distribution of the sensors 220 with proper coordinate transformation (to take into account their axial position), can provide azimuthal sensitivity to the formation properties. When the assembly 100 is used in LWD operations, drillstring rotation and the rather slow rate of penetration (ROP) provide for uniform azimuthal coverage and dense radial sampling, while axial motion (along the longitudinal axis of the LWD tool) provides continuous axial sampling.

Figure 3:
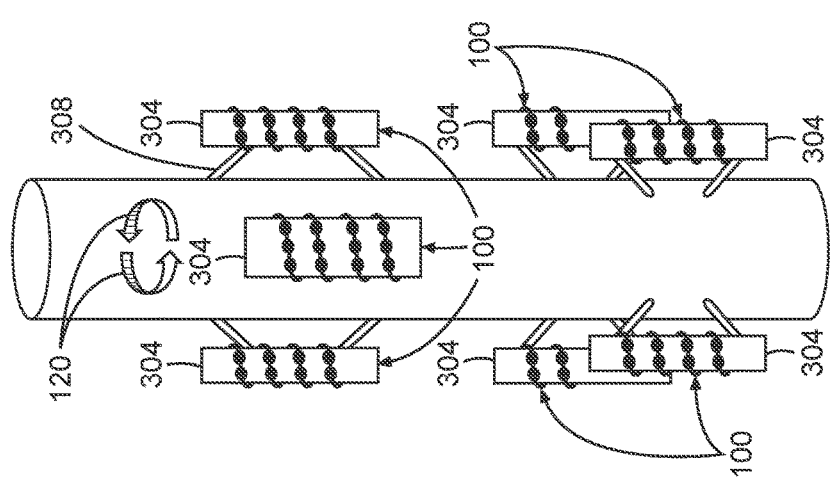
FIG. 3 is a side view of sources and sensors arranged for wireline use, in accordance with various embodiments of the invention.

FIG. 3 is a side view of sources 120 and sensors arranged for wireline use, in accordance with various embodiments of the invention. In this wireline logging embodiment, the fiber optic cable and sensors in the assembly 100 are wrapped around several pads 304. The pads 304 can be coupled to the borehole wall via caliper arms 308, among other mechanisms.

The excitation sources 120 (e.g., coils, current injectors) can be mounted on the pads 304 or within the housing 300. Multiple instances of the assembly 100, mounted to multiple pads 304 can be employed to provide full azimuthal coverage of the borehole wall. In some embodiments, the sensors in the assemblies 100 are employed to receive signals that return from the portion of the borehole wall that is proximate to those sensors. Other sensors, such as those that most directly face the housing 300 (and away from the wall), may be left out of the processing, due to blocking or shadow effects of the housing (e.g., the tool body).

Figure 4:
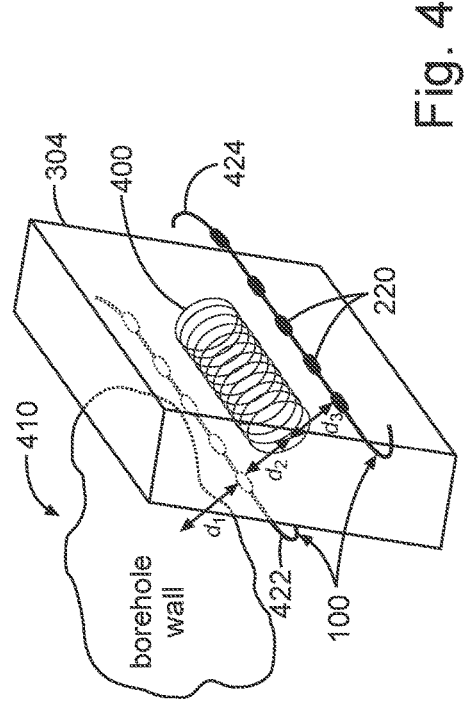
FIG. 4 is a perspective view of an electromagnetic source and sensors attached to a pad in accordance with various embodiments of the invention.

FIG. 4 is a perspective view of an electromagnetic source 400 and sensors attached to a pad 304 in accordance with various embodiments of the invention. Here the EM source 400 can be a transmitter coil that illuminates the formation 410 while a single array or double array of fiber optic-based sensors in an assembly 100 are employed to measure the EM fields. In this case, the sensors 220 can be magnetic dipole type.

In this example embodiment, the EM source 400 transmits primary EM waves dl into the formation 410. These waves create eddy currents in the formation which, in turn, create secondary EM waves that are influenced by the composition of the formation 410 and received by one or more assemblies 100 of fiber optic-based sensors that are placed on opposite sides of the source 400. Here one array of receivers 422 is located closer to the formation 410, and another array of receivers 424 is further away. As those of ordinary skill in the art will appreciate, after reading this disclosure, the positioning and connection between the arrays of receivers 422, 424, operational frequency, and measurement circuitry (not shown) can be selected so that the net signal measured by these arrays of receivers 422, 424 can be made approximately proportional to the conductivity of the formation 410.

Figure 5:
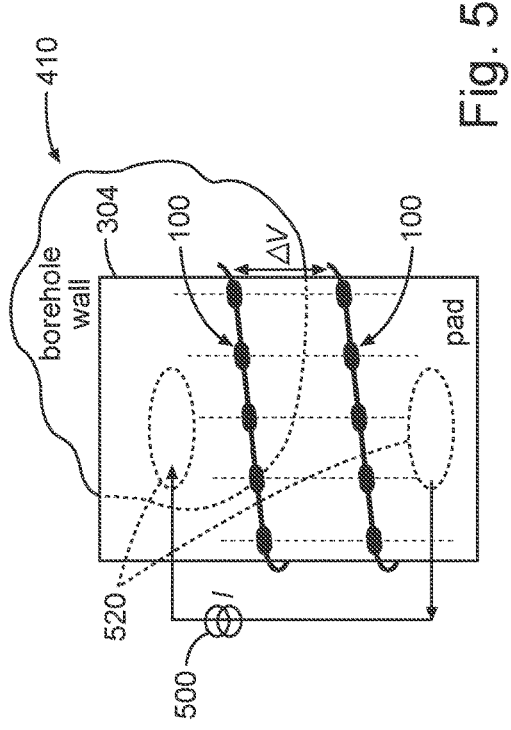
FIG. 5 is a perspective view of a current source and sensors attached to a pad in accordance with various embodiments of the invention.

FIG. 5 is a perspective view of a current source 500 and sensors attached to a pad 304 in accordance with various embodiments of the invention. Here the current source 500 is applied to electrodes 520 that are employed to inject alternating current into the formation 410 while measuring the potential difference ΔV between two or more assemblies 100 of fiber optic-based sensors, uniformly located, or staggered. The sensors in this case may comprise the electric dipole type and can be placed along the spiral of the fiber optic cable. With selective positioning of sensors and pads, it is possible to provide full azimuthal coverage of the borehole. In the above-mentioned embodiments, with multiple rows of sensors placed at substantially the same azimuthal position, the signals from the sensors can be averaged to provide some immunity to noise.

Figure 7:
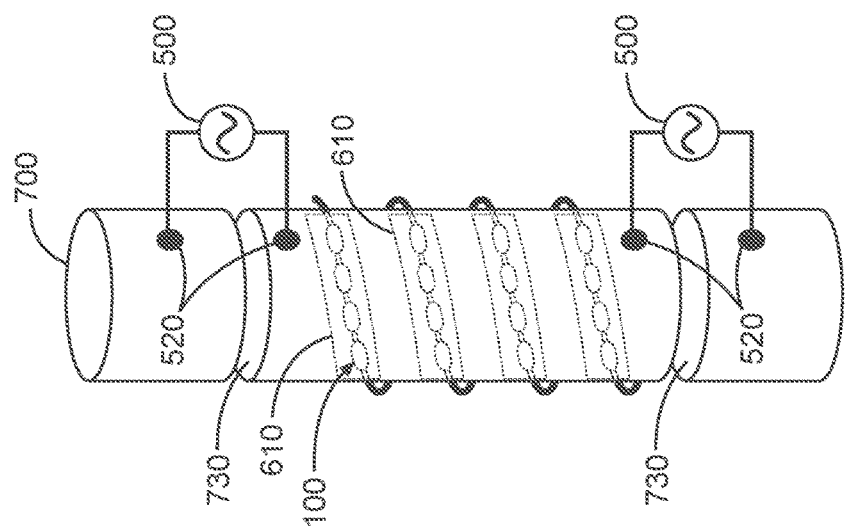
FIG. 7 is a side view of electromagnetic sources and electric dipole type sensors attached to a housing in accordance with various embodiments of the invention.
Figure 6:
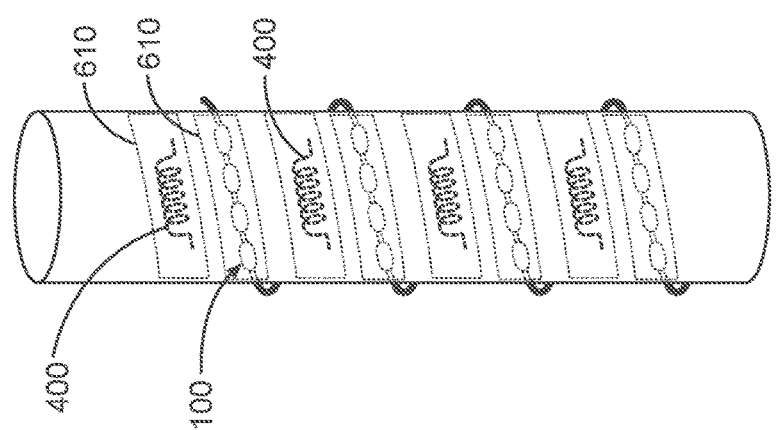
FIG. 6 is a side view of electromagnetic sources and magnetic dipole type sensors attached to a housing in accordance with various embodiments of the invention.

FIG. 6 is a side view of electromagnetic sources 400 and magnetic dipole type sensors attached to a housing 600 in accordance with various embodiments of the invention. FIG. 7 is a side view of electromagnetic sources 500 and electric dipole type sensors attached to a housing 700 in accordance with various embodiments of the invention. Referring now to FIG. 6, which depicts an LWD embodiment, the sources 400 may comprise transmitter coils embedded inside grooves 610 on the body of the housing 600, which may comprise a metallic collar. In this case, the sensors in the assembly 100 may comprise a magnetic dipole type to measure the magnetic field strength at various circumferential locations about the housing 600.

Referring now to FIG. 7, in another LWD embodiment, two or more sources 500 may be used to apply alternating current voltages to the housing 700 (e.g., a drill collar) across gaps 730 in the housing 700. Some portion of the resultant currents penetrate the formation in this case, and return to the sensors in the assembly 100 to provide an image of the formation surrounding the borehole in which the housing 700 is located. The fiber optic cable in the assembly 100 can be disposed inside spiral grooves 610 on the body of the housing 700. In this case, the sensors may comprise an electric dipole type to measure the electric field strength at various circumferential locations about the housing 700.

Embodiments for Defect and Flood Detection

Up to this point, the discussion has focused on open borehole, formation imaging. Fiber optic-based sensors distributed along a fiber optic cable can be employed for imaging borehole casing, perhaps to detect and evaluate defects in the casing. Identification of flawed casing sections can accelerate repair, and mitigate production delays. To perform this task, an EM source might be employed to illuminate the casing structure. The source may comprise an electric dipole or a magnetic dipole transmitter mounted on a sonde, or on pads that extend to contact the cased wall of the borehole. The response due to the casing can be measured via fiber optic-based sensors placed on spiral-shaped fiber optic cables mounted on pads, perhaps arranged as shown in FIG. 3.

In some embodiments, fiber optic-based sensors can be placed on spiral fiber optic cables to monitoring flood conditions, as might arise in cased and perforated boreholes. In one embodiment, the optical fiber in the assembly may be inserted in a protective, conductive tube which is used as the source for injecting the current into the formation. In another embodiment, a conductive coating on the optical fiber can be used as a source of radiation. In some of these conductively-shielded embodiments, the tube/coating is substantially continuous, with lower frequency sources that penetrate the shield to excite the formation. In some of these conductively-shielded embodiments, the tube/coating is discontinuous, with higher frequency sources that are unable to effectively penetrate the shield to excite the formation. In yet another embodiment, a permanently-installed EM device may operate as a source, located on or outside of (e.g., wrapped around the exterior of) the casing. Depending on placement, fiber optic-based sensors forming part of an assembly 100 can be used to provide high resolution two-dimensional imaging, so that water floods that endanger the production process may be effectively monitored.

Since an imaging or monitoring system installation may include multiple transmitters and multiple receivers, the embodiments described above may be supplemented by those that sequence the operation of sources and sensors, so that one or more transmitters may be activated at a time, and one or more sensors may be used for signal detection at a time. There is also a choice on how sources and sensors are connected, such as whether to operate them in series or parallel. For example, sources can be separated into two interlaced groups such that the sources within one group are serially connected and operate simultaneously but not in conjunction with the second group. In this way, the physical separation between jointly operating sources can be made larger (reducing interference between groups) so that groups of sources can be operated simultaneously, instead of sequentially, reducing the number of electrical connections to the surface.

Fiber Bend Losses

Figure 8:
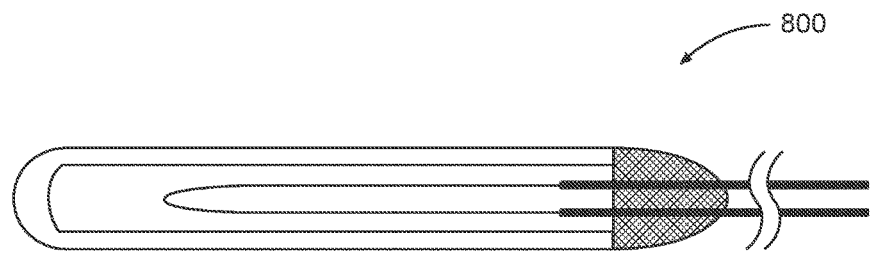
FIG. 8 is a side, sectioned view of an optical fiber coupler in accordance with various embodiments of the invention.

FIG. 8 is a side, sectioned view of an optical fiber coupler 800 in accordance with various embodiments of the invention. The optical signal in a fiber optic cable suffers large bend losses when the bend radius exceeds a certain threshold, which varies from cable to cable. Depending on the type of the fiber, the acceptable bend radius may range from sub-millimeters to couple of centimeters. As a result, some of the embodiments proposed herein may feature fibers that are bent in a way that exceeds the minimum radius. To overcome this difficulty, optical couplers 800 may be used to achieve a 180 degree change in direction without significant losses. An example includes the MiniBend coupling component DNS-1890, available from AFL of Duncan, S.C.

Data Acquisition

Figure 9:
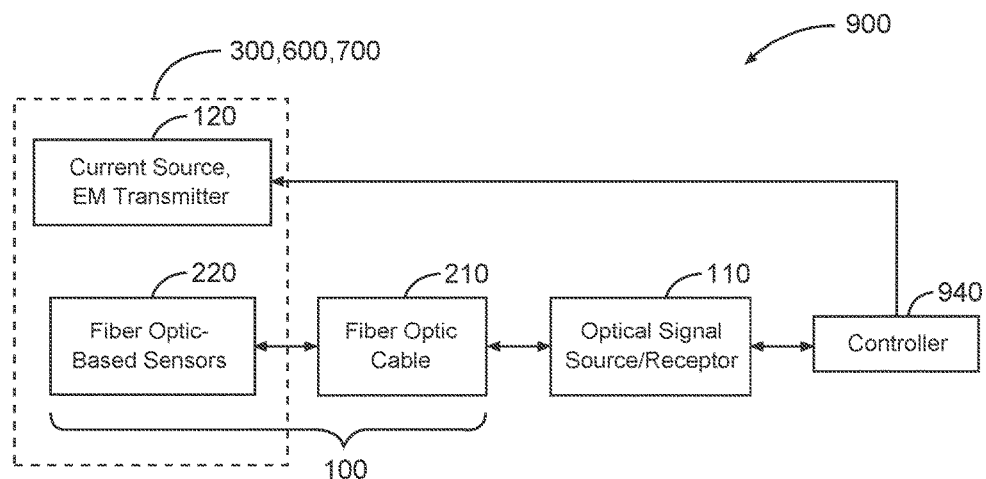
FIG. 9 is a block diagram of a data acquisition system in accordance with various embodiments of the invention.

FIG. 9 is a block diagram of a data acquisition system 900 in accordance with various embodiments of the invention. In the example shown, the system 900 comprises an excitation source comprising an EM transmitter, and an assembly comprising fiber optic-based sensors and a fiber optic cable.

The system 900 further comprises optical signal source/receptor electronics 110, and a controller 940, which is used to manage data acquisition and communication operations. The controller 940 may comprise a programmable logic controller, or an embedded processor, among others. When the desired parameter is sensed by one of the sensors in the assembly 100 (e.g., conductivity, resistivity, magnetic permeability, dielectric constant), it is transmitted via the fiber optic cable to the electronics 110. To improve communication performance in some embodiments, the signal in the optical transmission phase may be modulated, converted to a digital format, or digitally encoded. The signal that is transmitted into the fiber optic cable is received and reconstructed as desired, in ways that are well known to those of ordinary skill in the art.

Deployment

In wireline logging applications, sensors may be deployed so as to operate in intimate contact with the formation. This can be achieved by the use of a hydraulically actuated back-up arm, similar to the arms 308 shown in FIG. 3. This arm can be attached to a sonde that carries sources and sensors assembled to a fiber optic cable, as described above. The sonde can be lowered into a borehole using a surface instrumentation truck, which provides a cable and winch for lowering and raising the sonde, as well as the electrical power required for running the tool, and computers for data processing measurement interpretation, and permanent storage of the data. If desired, the back-up arm can be used to locate the sonde in close proximity to the borehole wall.

In LWD applications, the fiber optic cable that forms part of the assembly described previously can be embedded inside spiral grooves cut into drill collars, and covered by protective materials, such as plastic, or slotted conductors.

In water flood monitoring applications, the fiber optic-based sensors and cable can be embedded inside the cement that forms the exterior of the outer-most casing layer. The properties of the cement can be adjusted to promote flood sensing, communication, and deployment.

Processing

Figure 10:
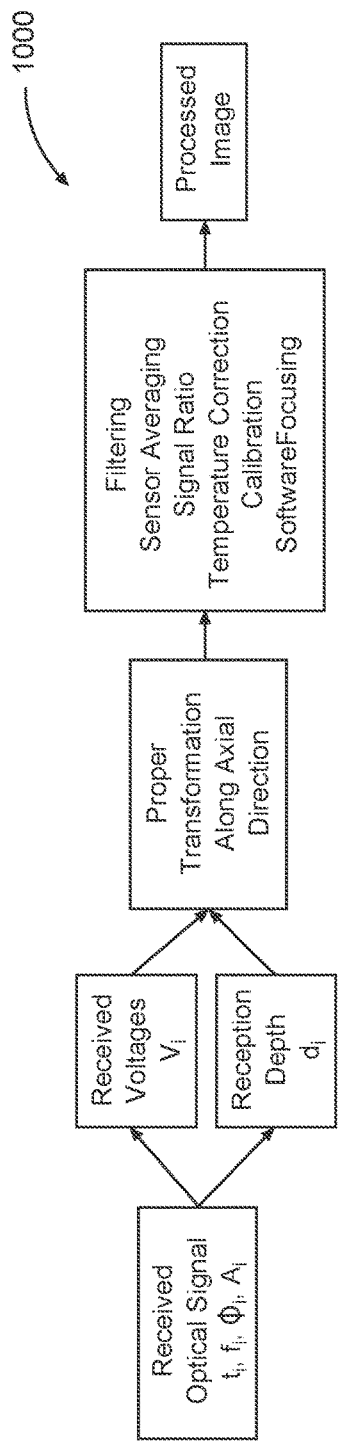
FIG. 10 is a flow diagram of a signal processing method in accordance with various embodiments of the invention.

FIG. 10 is a flow diagram of a signal processing method 1000 in accordance with various embodiments of the invention. The signal that is provided by sensor i is received at the surface, via perturbations of the optical channel. Due to transmission line characteristics of the channel, it is possible to recover the signal (i.e., sensor measurement) information, as well as the physical position of the sensor on the fiber optic cable. This plurality of information can be obtained from a combination of time $t_i$ (e.g., time division multiplexing), frequency $f_i$, phase $\Phi_i$, wavelength (e.g., wavelength division multiplexing), and/or amplitude $A_i$ characteristic of the received optical signal. For example, the time of arrival $t_i$ of the optical signal can independently provide the position of the sensor, while the measurement information can be embedded in the phase $\Phi_i$ (or the amplitude $A_i$). This information can be transformed into a measured voltage $V_i$ and reception depth $d_i$, as well as a location in the axial direction.

Some of the operations that can be applied to the acquired sensor measurement information (as well as to the processed image that results at the end of the signal processing method 1000) include: filtering to reduce noise; averaging multiple sensor data to reduce noise; taking the difference or the ratio of multiple voltages to remove unwanted effects such as a common voltage drift due to temperature; other temperature correction schemes such as the application of a temperature correction table; calibration to known/expected parameter values from an existing well log; and array processing (software focusing, to provide the equivalent of a focal array) of the data to achieve different depth of detection or vertical/azimuthal resolution. The resulting processed data can be used to provide an image of the surrounding formation, the casing, and other elements that are located downhole. The acquired measurement signal and position information can also be stored in a memory for recall and further processing. All of these operations above are well-known in the field of EM well logging and their details will not be provided here.

Inversion

Figure 11:
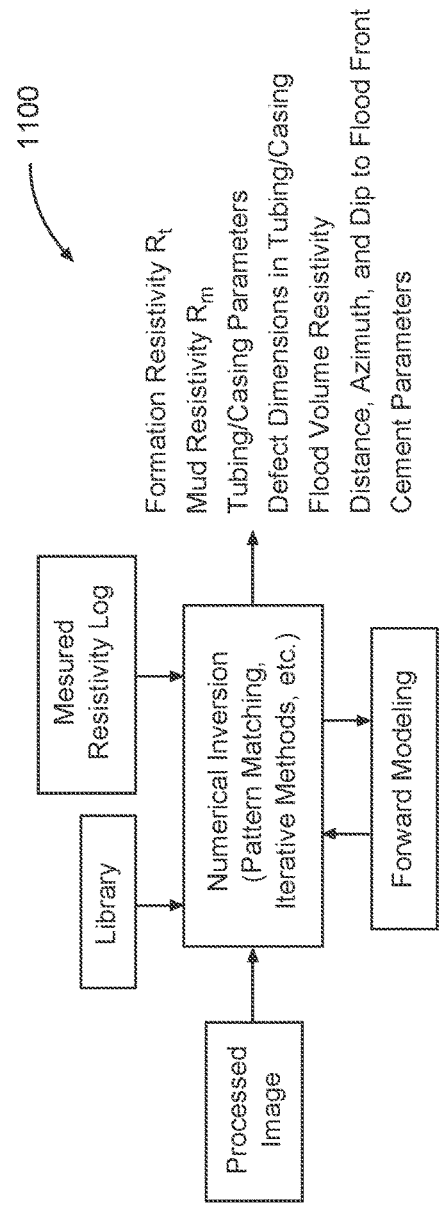
FIG. 11 is a flow diagram of an inversion processing method in accordance with various embodiments of the invention.

FIG. 11 is a flow diagram of an inversion processing method 1100 in accordance with various embodiments of the invention. As is well known to those of ordinary skill in the art, inversion processing includes operations that convert the apparent resistivity, apparent conductivity, time decay response, etc. into properties of formation layers, mud parameters, and casing/tubing parameters.

In some embodiments, a numerical model of the formation and/or casing is constructed for use in forward modeling and construction of a library.

The inversion method may then operate as follows: the processed image (provided by the signal processing method 1000 of FIG. 10) is compared to signals/images in the library or signals/images derived from the forward modeling code, and an iterative numerical optimization problem is solved based on the difference between the two. The result is a determination of various parameters, such as formation resistivity, mud resistivity, tubing/casing parameters (including defect dimensions), flood volume resistivity, distance/azimuth/dip to the flood front, and cement parameters.

Effects due to the presence of the sensor housing, pad structure, mutual coupling between sensors, tubing/casing, mud, and cement can be corrected by using a priori information on these parameters, or by solving for some or all of them during the inversion process. Since these effects are mainly additive, they can be removed using appropriate calibration schemes. The multiplicative (scaling) portion of these effects can be removed in the process of calibration to an existing log. All additive, multiplicative and any other non-linear effect can be determined via solution by including them in the inversion process as a parameter. As the individual elements of the signal processing shown in FIG. 10, and the inversion processing in FIG. 11, including the removal of deleterious effects on the measurement data, are all well known to those of ordinary skill in the art, further details are not provided here.

Interpretation

Arrays of sensors, assembled along a spiral fiber optic cable as described previously, can be used to provide a dense sampling of formation and tubing/casing micro-resistivity or micro-induction in both the vertical and azimuthal directions on the borehole surface. This two-dimensional data can be mapped into an image format to produce a "core-like" borehole wall image. The creation of this type of imagery allows fine-scale features to be recognized through essentially the same interpretation procedure as is employed during the examination of core photographs.

Figure 12:
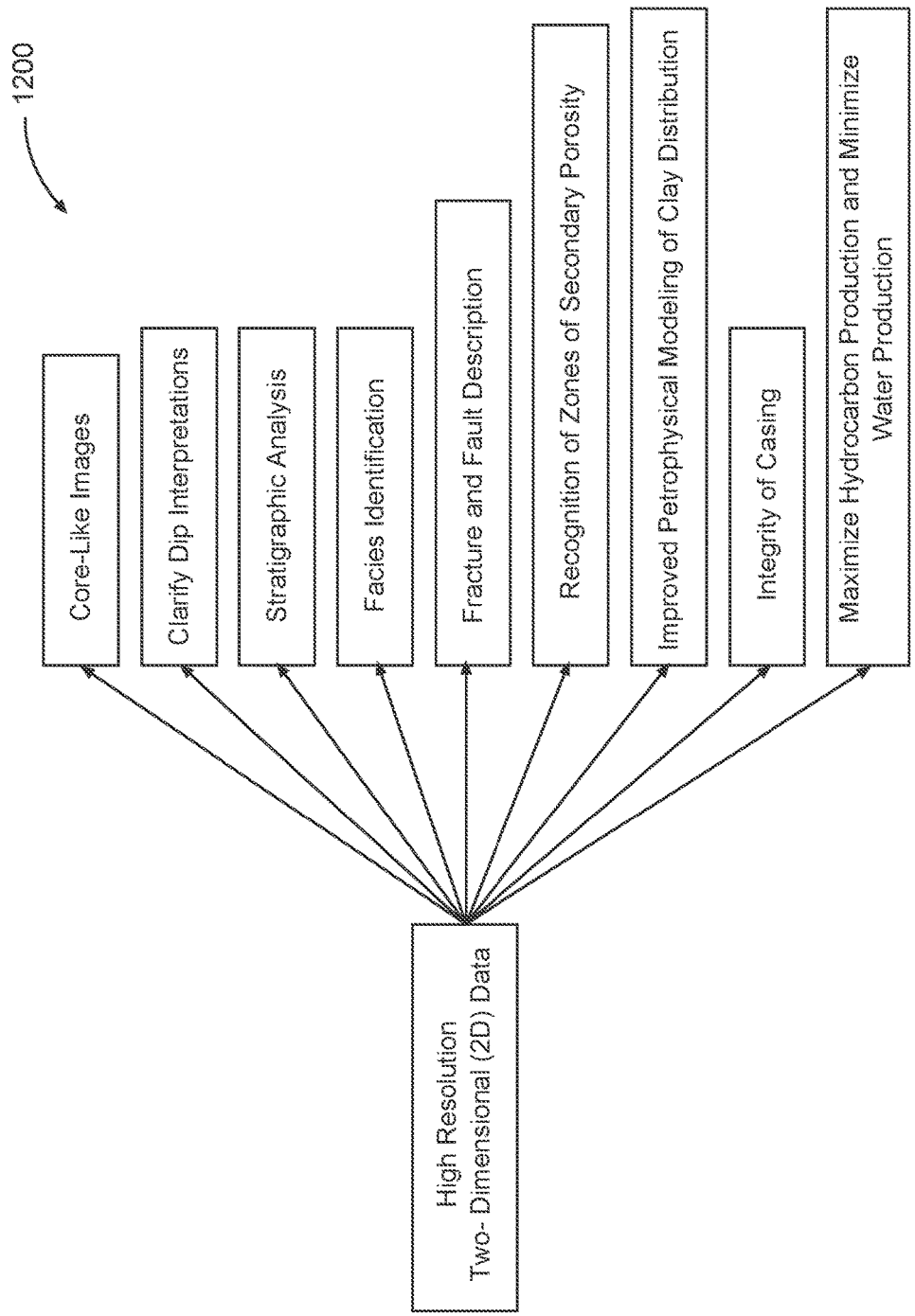
FIG. 12 is a data interpretation diagram in accordance with various embodiments of the invention.

FIG. 12 is a data interpretation diagram 1200 in accordance with various embodiments of the invention, helping to illustrate various possibilities. For example, since the resolution of images created with apparatus constructed according to the information provided herein can be on the order of a few millimeters in both vertical and azimuthal directions, such images can be used to resolve ambiguity in dip borehole dip interpretations, whether the borehole is conductive or non-conductive. By enabling core-like characterizations, the acquired data can be used in many applications, including stratigraphic analysis, facies (i.e., material composition) identification, fracture and fault description, recognizing zones of secondary porosity, and improved petrophysical modeling of clay distribution (e.g., determining laminated versus dispersed shales), among others.

When using sensors coupled to a fiber optic cable in conjunction with a wireline sonde or drillstring housing to scan cased boreholes, the resulting high resolution images assist the interpreter in evaluating the integrity of the tubing/casing. By detecting and estimating the size of smaller defects, predictions of increasing reliability can be made with respect to the useful life-time of the tubing/casing, including decisions to replace flawed sections.

Similarly, when monitoring the water flood region for cased boreholes, operational, automated actions can be taken with respect to production. For example, possible actions include: stopping or slowing down injection from a secondary well when an approaching water flood is detected; selectively stopping or slowing down production from a set of perforations that produce water or that are predicted to produce water in a relatively short time (e.g., by a trending increase in conductivity in the formation); and any operational activity that increases hydrocarbon production, while reducing water production.

Conventional borehole imager tools only cover a portion of the borehole wall in the azimuthal direction. As a matter of contrast, various embodiments utilize a combination of fiber optic-based sensors and fiber optic cable, which simultaneously serves as a sensor locator and a measurement data communication channel. The resulting assembly is physically flexible, with a high operational bandwidth capability (for imaging geometric areas with complex contours). High resolution imaging of the formation, with the possibility of 100% azimuthal coverage, are now possible. For example, using EM transmitters and fiber optic-based sensors, imaging of conductive (water-based) and non-conductive (oil-based) muds in open boreholes can be performed. The measurements obtained will give geologists insight into the complexities of reservoirs that are stratigraphically controlled, structurally controlled, or both. High resolution monitoring of the integrity of tubing/casing in the cased boreholes is also practical. Each of these applications produce significant financial advantages. Thus, additional embodiments may be realized.

Logging System

Figure 13:
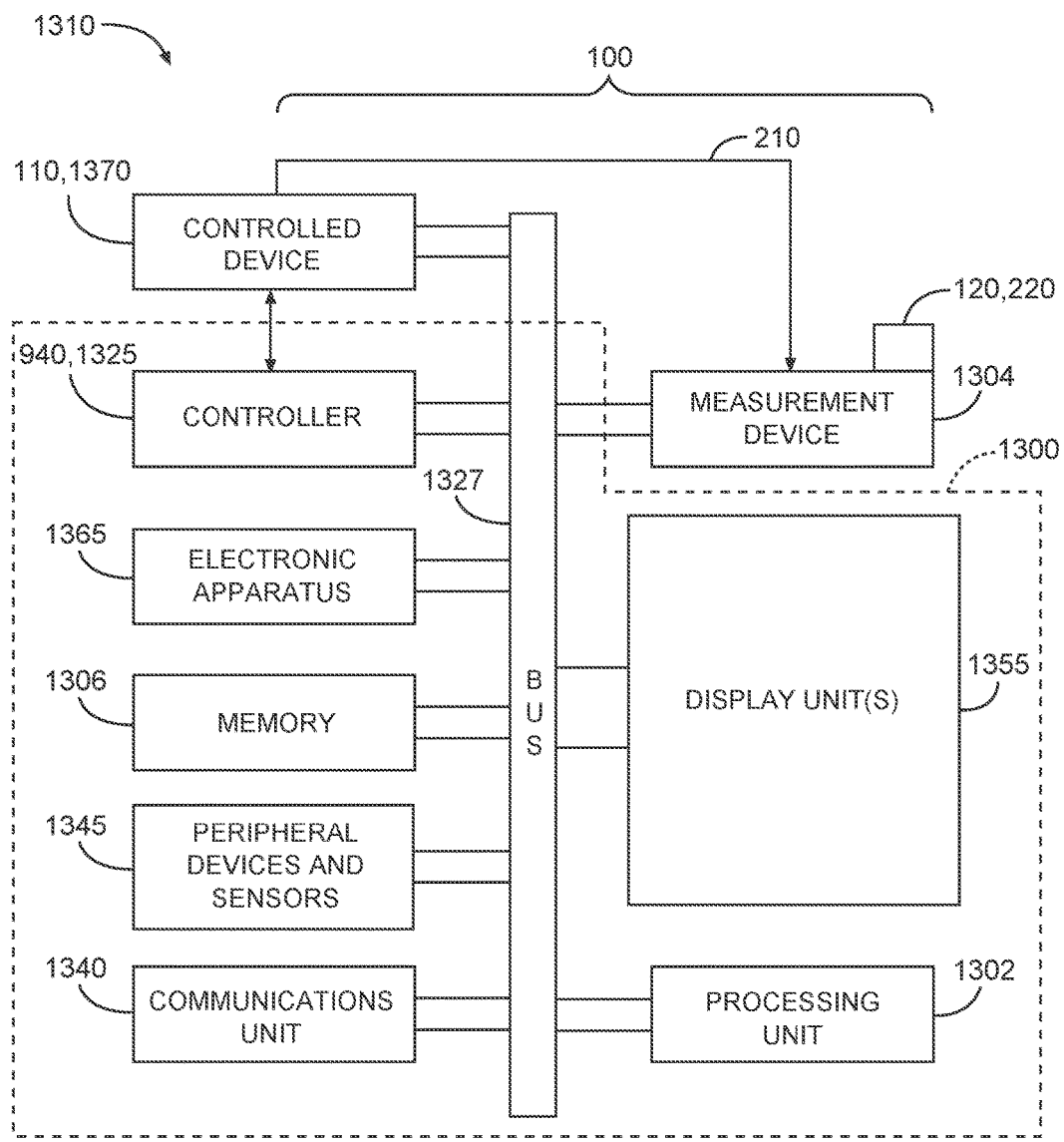
FIG. 13 is a block diagram of a logging system according to various embodiments of the invention.

FIG. 13 is a block diagram of a logging system 1300 according to various embodiments of the invention. Referring now to FIGS. 9 and 13, it can be seen that the logging system 1300 may include the controller 940 as part of the controller 1325, and the optical signal source/receptor electronics 110 as part of the controlled device 1370. The system 1300 may further include one or more sources 120, and fiber optic-based sensors 220, as part of the measurement device 1304. When configured in this manner, the logging system 1300 can receive measurements and other data (e.g., location information) from the optical signal source/receptor electronics 110, as provided by the fiber-optic based sensors 220 and the fiber optic cable 210 that form parts of the assembly 100.

The processing unit 1302 can couple to the measurement device 1304 to obtain measurements from the measurement device 1304, and its components, as described earlier herein. In some embodiments, a logging system 1300 comprises one or more assemblies 100, as well as a housing (not shown in FIG. 13; see FIGS. 3 and 6-7) that can house the assemblies 100, and other elements. The housing might take the form of a wireline tool body, or a downhole tool as described in more detail below with reference to FIGS. 15 and 16. The processing unit 1302 may be part of a surface workstation or attached to a downhole tool housing. In some embodiments, the processing unit 1302 is packaged within the assembly 100, as described earlier herein.

The logging system 1300 can include a controller 1325, other electronic apparatus 1365, and a communications unit 1340. The controller 1325 and the processing unit 1302 can be fabricated to operate the assembly 100 to acquire measurement data, such as signals representing sensor measurements, perhaps resulting from perturbation of the optical fiber cable 210 by actuators coupled to the sensors 220.

Electronic apparatus 1365 (e.g., electromagnetic sensors, current sensors) can be used in conjunction with the controller 1325 to perform tasks associated with taking measurements downhole. The communications unit 1340 can include downhole communications in a drilling operation. Such downhole communications can include a telemetry system.

The logging system 1300 can also include a bus 1327 to provide common electrical signal paths between the components of the logging system 1300. The bus 1327 can include an address bus, a data bus, and a control bus, each independently configured. The bus 1327 can also use common conductive lines for providing one or more of address, data, or control, the use of which can be regulated by the controller 1325.

The bus 1327 can include instrumentality for a communication network. The bus 1327 can be configured such that the components of the logging system 1300 are distributed. Such distribution can be arranged between downhole components such as the measurement device 1304 and components that can be disposed on the surface of a well. Alternatively, several of these components can be co-located, such as on one or more collars of a drill string or on a wireline structure.

In various embodiments, the logging system 1300 includes peripheral devices that can include displays 1355, additional storage memory, or other control devices that may operate in conjunction with the controller 1325 or the processing unit 1302. The display 1355 can display diagnostic and measurement information for the assembly 100, based on the signals generated according to embodiments described above.

In an embodiment, the controller 1325 can be fabricated to include one or more processors. The display 1355 can be fabricated or programmed to operate with instructions stored in the processing unit 1302 (for example in the memory 1306) to implement a user interface to manage the operation of the assembly 100, as well as other components distributed within the logging system 1300. This type of user interface can be operated in conjunction with the communications unit 340 and the bus 327. Various components of the logging system 300 can be integrated with the gamma ray measurement apparatus 304 or associated housing such that processing identical to or similar to the methods discussed previously, and those that follow, with respect to various embodiments that are described herein.

Methods

In various embodiments, a non-transitory machine-readable storage device can comprise instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory 306 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 302. Operating on these physical structures can cause the machine to become a specialized machine that performs operations according to methods described herein. The instructions can include instructions to cause the processing unit 1302 to store associated data or other data in the memory 1306. The memory 1306 can store the results of measurements of formation and casing/tubing parameters, to include gain parameters, calibration constants, identification data, sensor location information, etc. The memory 1306 can store a log of the measurement and location information provided by the assembly 100. The memory 1306 therefore may include a database, for example a relational database.

Figure 14:
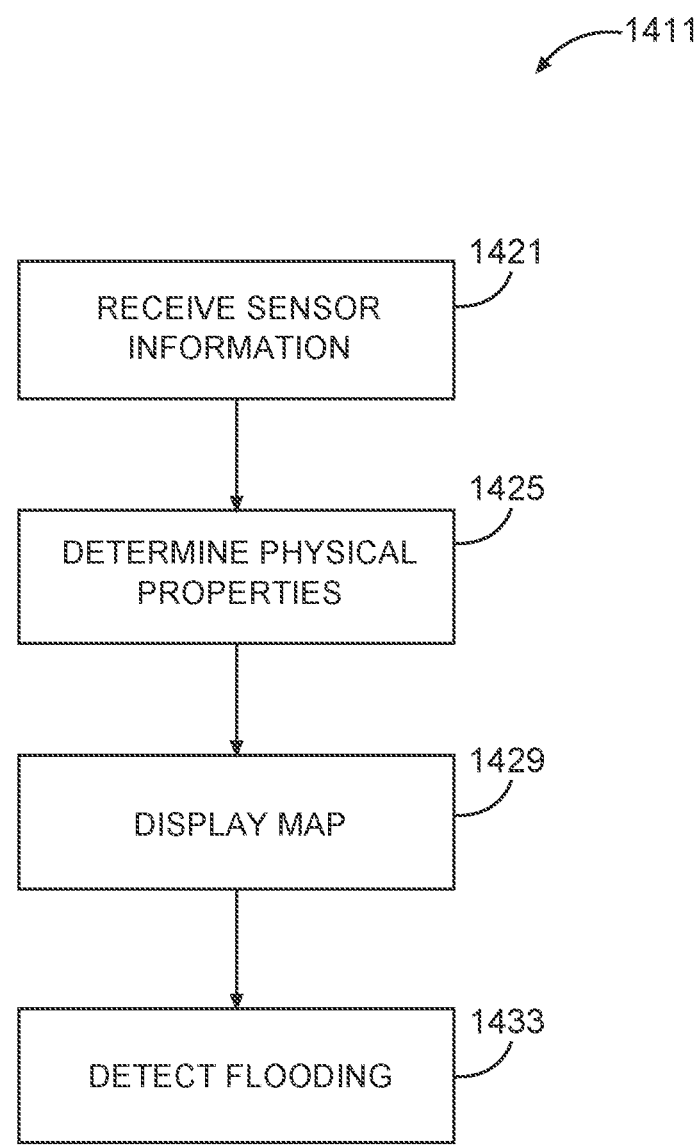
FIG. 14 is a flow diagram illustrating data acquisition and processing methods, according to various embodiments of the invention.

FIG. 14 is a flow diagram 1411 illustrating data acquisition and processing methods, according to various embodiments of the invention. The methods 1411 described herein are with reference to the apparatus and systems shown in FIGS. 1-13. Thus, in some embodiments, a method 411 comprises receiving physical parameter measurements from sensors coupled to a spiral-shaped fiber at block 1421, and determining material properties based on the information at block 1425. Referring briefly to FIG. 2, it is noted that for the purposes of this document, the term "spiral-shaped" means a helix 230 that makes at least one complete revolution (i.e., 360 degrees) along a substantially circular path. Many variations may be realized.

For example, in some embodiments, a method 411 begins at block 421 with receiving sensor information from a series of sensors coupled to a spiral-shaped optical fiber, wherein the sensor information comprises a signal integrating at least the location of one or more of the sensors along the optical fiber, and a physical parameter measurement.

The sensors can be arranged to cover approximately equal angles around an arc, such as a semicircle, or a circle. Thus, the azimuthal angle of sensitivity for the sensors may be approximately equally divided among the sensors.

Sensor sampling can occur using each and every sensor in the series of sensors for high resolution imaging studies, or a lesser number of sensors. That is, some subset of the sensors (e.g., alternating ones, or skipping sets of two or more sensors, etc.) may be used for imaging with lower resolution. Thus, the activity at block 1421 may comprise receiving the sensor information from the series of sensors coupled to the spiral-shaped optical fiber, wherein the sensor information comprises integrated signals acquired from a selected subset of the series, and wherein membership in the selected subset comprises less than all members of the series. In these reduced resolution applications, the activity at block 1421 may comprise selecting a number of the series of sensors to form the subset, wherein the number is half or less than a number of all of the members of the series.

The method 1411 may continue on to block 1425 to include determining a physical property of the material in a geological formation based on the physical parameter measurement. The information from the sensor, such as the sensor location or value of the measurement, can be encoded in the signal provided to the optical fiber. Thus, the activity at block 1425 may comprise determining the physical property based on values encoded in an amplitude component or a phase component of the signal, among others.

The sensor measurement information, and properties derived from the information, can be displayed in a visible form. Thus, the method 1411 may continue on to block 1429 to include displaying a map of at least one of the sensor information, the signal, the location, or the physical property in a visible format.

The sensor information can be used to determine borehole flooding conditions. Thus, the method 1411 may continue on to block 1433 to include determining that a fluid is flooding the borehole in the geological formation based on the sensor information. Many other embodiments may be realized.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program, to perform the methods described herein. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment. Thus, other embodiments may be realized.

Systems

Figure 15:
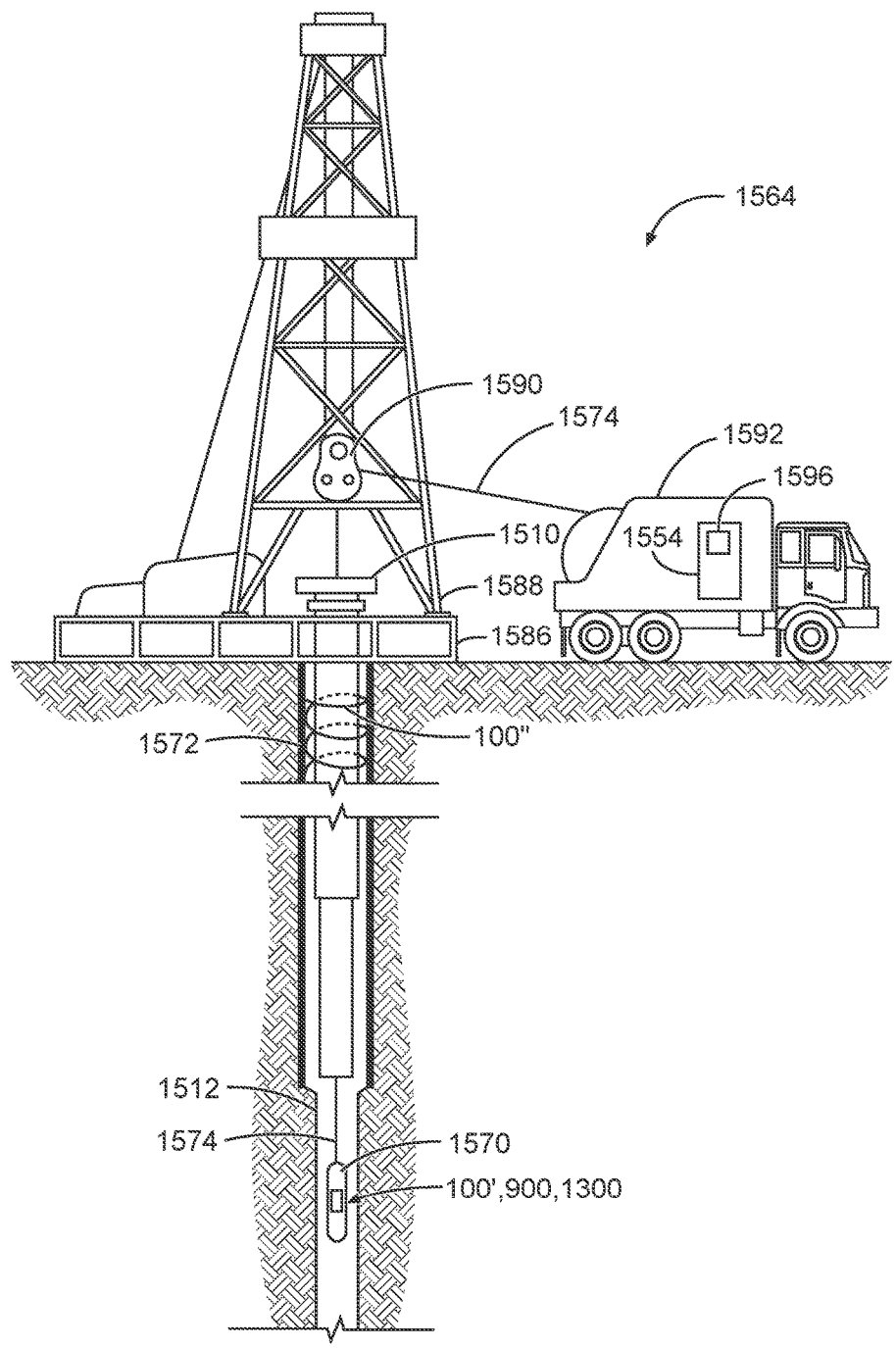
FIG. 15 depicts an example wireline system, according to various embodiments of the invention.
Figure 16:
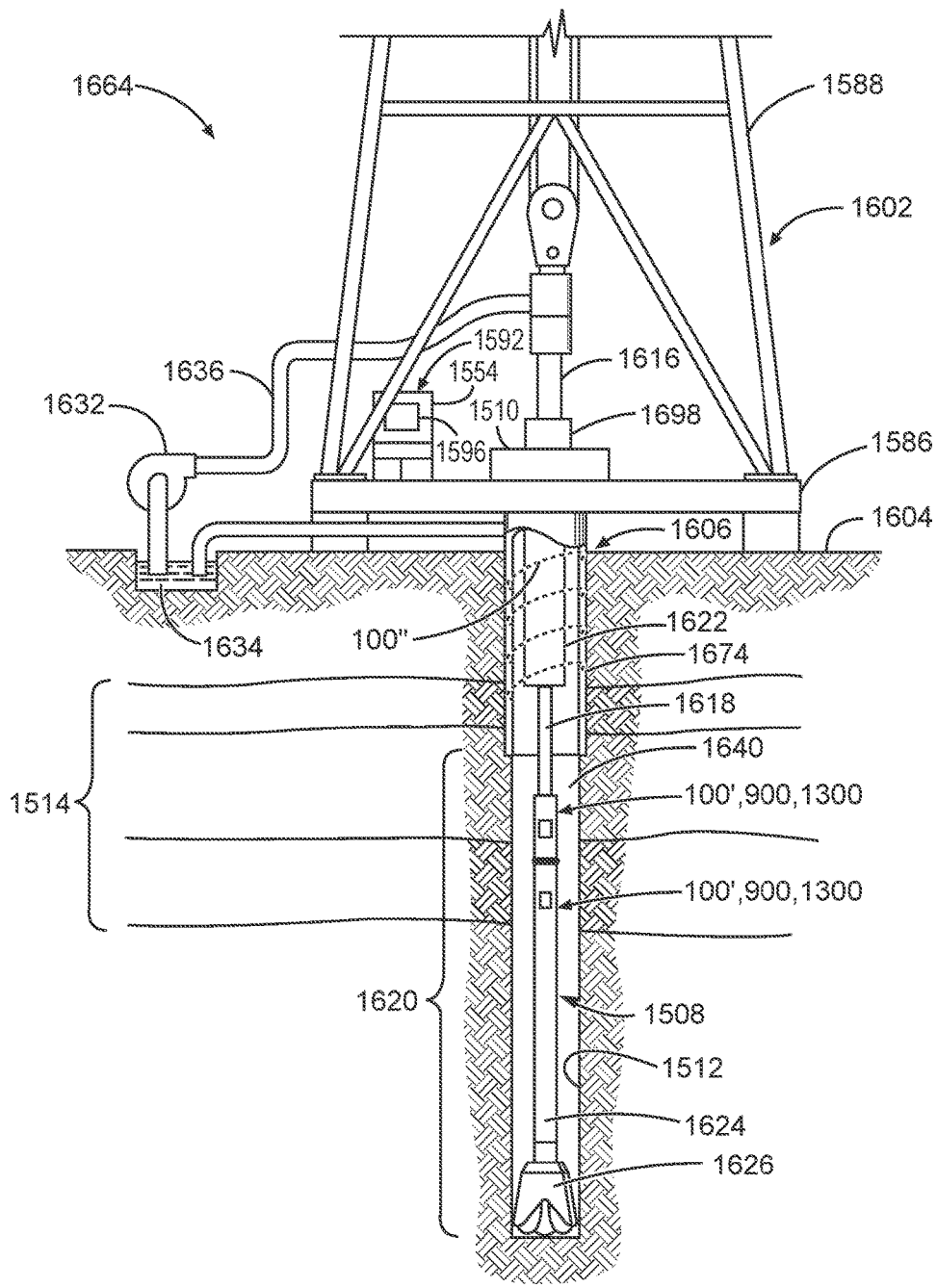
FIG. 16 depicts an example drilling rig system, according to various embodiments of the invention.

FIG. 15 depicts an example wireline system 1564, according to various embodiments of the invention. FIG. 16 depicts an example drilling rig system 1664, according to various embodiments of the invention. Either of the systems in FIG. 15 and FIG. 16 are operable to control an assembly 100 (shown in FIGS. 15 and 16 as assembly 100' to designate an assembly 100 mounted to a wireline logging body 1570, or a downhole tool 1624; and as assembly 100" to designate an assembly 100 mounted within or upon the casing or cement of a borehole 1512) and/or systems 900, 1300 to conduct measurement operations in a wellbore, and to provide images of the casing/tubing and formation surrounding the wellbore. Thus, the systems 1564, 1664 may comprise portions of a wireline logging tool body 1570 as part of a wireline logging operation, or of a downhole tool 1624 (e.g., a drilling operations tool) as part of a down hole drilling operation.

Returning now to FIG. 15, a well during wireline logging operations can be seen. In this case, a drilling platform 1586 is equipped with a derrick 1588 that supports a hoist 1590.

Drilling oil and gas wells is commonly carried out using a string of drill pipes connected together so as to form a drilling string that is lowered through a rotary table 1510 into a wellbore or borehole 1512. Here it is assumed that the drilling string has been temporarily removed from the borehole 1512 to allow a wireline logging tool body 1570, such as a probe or sonde, to be lowered by wireline or logging cable 1574 into the borehole 1512. Typically, the wireline logging tool body 1570 is lowered to the bottom of the region of interest and subsequently pulled upward at a substantially constant speed.

During the upward trip, at a series of depths the instruments (e.g., the assembly 100 (shown here as assembly 100') and sources 120 shown in FIG. 1) included in the tool body 1570 may be used to perform measurements on the subsurface geological formations adjacent the borehole 1512 (and the tool body 1570). The measurement data can be communicated to a surface logging facility 1592 for storage, processing, and analysis. The logging facility 1592 may be provided with electronic equipment for various types of signal processing, which may be implemented by any one or more of the components of the systems 900, 1300 shown in FIGS. 9 and 13. Similar formation evaluation data may be gathered and analyzed during drilling operations (e.g., during LWD operations, and by extension, sampling while drilling).

In some embodiments, the tool body 1570 comprises one or more assemblies 100' for obtaining and communicating measurements in a subterranean formation through a borehole 1512. The tool is suspended in the wellbore by a wireline cable 1574 that connects the tool to a surface control unit (e.g., comprising a workstation 1554, which can also include a display). The tool may be deployed in the borehole 1512 on coiled tubing, jointed drill pipe, hard wired drill pipe, or any other suitable deployment technique.

Turning now to FIG. 16, it can be seen how a system 1664 may also form a portion of a drilling rig 1602 located at the surface 1604 of a well 1606. The drilling rig 1602 may provide support for a drill string 1608. The drill string 1608 may operate to penetrate the rotary table 1510 for drilling the borehole 1512 through the subsurface formations 1514. The drill string 1608 may include a Kelly 1616, drill pipe 1618, and a bottom hole assembly 1620, perhaps located at the lower portion of the drill pipe 1618.

The bottom hole assembly 1620 may include drill collars 1622, a downhole tool 1624, and a drill bit 1626. The drill bit 1626 may operate to create the borehole 1512 by penetrating the surface 1604 and the subsurface formations 1614. The downhole tool 1624 may comprise any of a number of different types of tools including MWD tools, LWD tools, and others.

During drilling operations, the drill string 1608 (perhaps including the Kelly 1616, the drill pipe 1618, and the bottom hole assembly 1620) may be rotated by the rotary table 1510. Although not shown, in addition to, or alternatively, the bottom hole assembly 1620 may also be rotated by a motor (e.g., a mud motor) that is located downhole. The drill collars 1622 may be used to add weight to the drill bit 1626. The drill collars 1622 may also operate to stiffen the bottom hole assembly 1620, allowing the bottom hole assembly 1620 to transfer the added weight to the drill bit 1626, and in turn, to assist the drill bit 1626 in penetrating the surface 1604 and subsurface formations 1514.

During drilling operations, a mud pump 1632 may pump drilling fluid (sometimes known by those of ordinary skill in the art as "drilling mud") from a mud pit 1634 through a hose 1636 into the drill pipe 1618 and down to the drill bit 1626. The drilling fluid can flow out from the drill bit 1626 and be returned to the surface 1604 through an annular area 1640 between the drill pipe 1618 and the sides of the borehole 1512. The drilling fluid may then be returned to the mud pit 1634, where such fluid is filtered. In some embodiments, the drilling fluid can be used to cool the drill bit 1626, as well as to provide lubrication for the drill bit 1626 during drilling operations. Additionally, the drilling fluid may be used to remove subsurface formation cuttings created by operating the drill bit 1626.

Thus, it may be seen that in some embodiments, the systems 1564, 1664 may include a drill collar 1622, a downhole tool 1624, and/or a wireline logging tool body 1570 to house one or more assemblies 100', similar to or identical to those that have been described above. Components of the systems 900 and 1300 in FIGS. 9 and 13, respectively, may also be housed by the tool 1624 or the tool body 1570.

Thus, for the purposes of this document, the term "housing" may include any one or more of a drill collar 1622, a downhole tool 1624, or a wireline logging tool body 1570 (all having an outer wall, to enclose or attach to magnetometers, sensors, fluid sampling devices, pressure measurement devices, transmitters, receivers, fiber optic cable, acquisition and processing logic, and data acquisition systems). The tool 1624 may comprise a downhole tool, such as an LWD tool or MWD tool. The wireline tool body 1570 may comprise a wireline logging tool, including a probe or sonde, for example, coupled to a logging cable 1574. Many embodiments may thus be realized.

For example, a system 1564, 1664 may comprise a downhole tool body, such as a wireline logging tool body 1570 or a downhole tool 1624 (e.g., an LWD or MWD tool body), and one or more assemblies 100' and sources 120 attached to the tool body.

Any of the above components, for example the assemblies 100 (and each of its elements), the systems 900, 1300, 1564, 1664 (and each of their elements) may all be characterized as "modules" herein. Such modules may include hardware circuitry, and/or a processor and/or memory circuits, software program modules and objects, and/or firmware, and combinations thereof, as desired by the architect of the apparatus and systems described herein, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a measured radiation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus and systems are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Thus, many other embodiments may be realized.

For example, referring now to FIGS. 1-16, it can be seen that in some embodiments, an apparatus may comprise a wireline housing 300 attached to pads 304 that are surrounded by sensors coupled to optical fiber spirals (as part of the assembly 100). Thus, an apparatus may comprise a wireline housing 300 and multiple pads 304 attached to the wireline housing. Some or all of the pads 304 may include a series of sensors 220 coupled to a spiral-shaped optical fiber 210 to provide, when operating, sensor information comprising a signal integrating at least the location of one or more of the sensors along the optical fiber, and a physical parameter measurement.

One or more electromagnetic sources 400 can be coupled to the surface of the pads 304, or embedded within the pads 304. Thus, an apparatus may comprise one or more electromagnetic sources 400 attached to one or more of the pads 304. Some, none, or all of the sensors 220 may comprise magnetic dipole sensors.

Current injection sources 500 may likewise be coupled to the surface of the pads 304, or embedded within the pads 304. Thus, an apparatus may comprise one or more current injection sources 500 attached to one or more of the pads 304. Some, none, or all of the sensors 220 may comprise voltage differential sensors.

The sensors 220 may comprise magnetic or electric dipole sensors. Thus, the sensors 220 may comprise one or more magnetic sensors and/or one or more electrical dipole sensors.

In some embodiments, sensors 220 can be coupled to an optical fiber spiral 210 that is disposed in the groove(s) 610 of a housing 600, 700. Therefore, an apparatus may comprise a downhole tool housing 600, 700 with a cylindrical surface having a spiral-shaped groove 610. The apparatus may further comprise a series of sensors 220 coupled to an optical fiber 210 disposed within the spiral groove 610 to provide, when operating, sensor information comprising a signal integrating at least a location of one or more of the sensors along the optical fiber, and a physical parameter measurement.

A magnetic dipole transmitter, as a source 400, may form part of the apparatus. Thus, the apparatus may comprise one or more magnetic dipole transmitters attached to the housing 600.

Magnetic dipole sensors may form part of the apparatus. Thus, at least some of the sensors 220 attached to the housing 600, 700 may comprise magnetic dipole sensors.

An electric dipole transmitter, as a source 500, may form part of the apparatus. Thus, the apparatus may comprise one or more electric dipole transmitters attached to the housing 700, to apply, when operating, an alternating current to the housing to produce an alternating field at a gap 730 in the housing.

Similarly, electrical dipole sensors may form part of the apparatus. Thus, one or more of the sensors 220 attached to the housing 600, 700 may comprise electrical dipole sensors.

In some embodiments, sensors 220 can be coupled to an optical fiber 210 spiral that is disposed within or upon the casing or cement of a borehole (see assembly 100″ in FIGS. 15 and 16). Thus, an apparatus may comprise cement 1572 or casing 1674 in a borehole 1512 and a series of sensors 220. The sensors 220 may be coupled to an optical fiber 210 embedded in or attached to a wall of the cement 1572 or the casing 1674, wherein the optical fiber 210 comprises a spiral-shape to follow an azimuthal path around the borehole 1512. The sensors 220 are used to provide, when operating, sensor information comprising a signal integrating at least a location of one or more of the sensors along the optical fiber, and a physical parameter measurement.

As noted previously, a variety of physical parameters can be measured by the sensors. For example, the physical parameter measurement may comprise any one or more of conductivity, resistivity, magnetic permeability, or a dielectric constant, among others.

A memory may form part of the apparatus. Thus, in some embodiments, the apparatus comprises a memory 1306 to store a log of one or more of the sensor information, the signal (carried by the optical fiber), the location, or the physical parameter measurement, among other information.

A detection device may form part of the apparatus. Thus, the apparatus may comprise a detection device to monitor the sensor information and to responsively provide an indication of fluid flooding in the borehole. For example, the detection device may comprise a processing unit 1302 or controller 1325 programmed to respond to rapid increases in conductivity, either within or near the borehole, as measured and indicated by the series of sensors 220 coupled to the optical fiber 210.

Thus, the detection device may operate based on conductivity measurements. This means that the detection device may comprise an analog or digital conductivity measurement device to predict the future occurrence of the fluid flooding.

The detection device may provide signals to alarm on selected conditions, or to initiate corrective action. Thus, the detection device may be used to provide a signal to slow down or stop production from one or more perforations in a borehole (e.g., when flooding is indicated to be imminent, or occurring in fact).

In summary, using the apparatus, systems, and methods disclosed herein may provide fiber optic-based sensors employed on spiral fiber optic links to provide full azimuthal coverage and imaging capabilities within a borehole. The fiber optic link is also utilized for precisely locating the sensors. Advantages include: (a) continuous logging of the formation, without precise localization of the sensors (since fiber optic cable can provide that information); (b) high resolution azimuthal and axial imaging, leading to improved petrophysical and stratigraphical interpretation; and (c) the use of fiber optic receivers, instead of bulky EM sensors. These advantages can significantly enhance the value of the services provided by an operation/exploration company, helping to reduce time-related costs, and providing greater return on investment.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method, comprising:
   lowering a wireline housing, wherein multiple pads are attached to the wireline housing, and wherein the multiple pads are in contact with a borehole wall;
   receiving sensor information from sensors coupled to a spiral-shaped optical fiber, wherein the sensor information comprises a signal integrating at least one of a depth and an azimuth of one or more of the sensors along the spiral-shaped optical fiber, and a physical parameter measurement, and wherein the spiral-shaped optical fiber is attached to a respective pad of the multiple pads; and
   determining a physical property of a material in a geological formation based on the physical parameter measurement.

2. The method of claim 1, further comprising:
   displaying a map of at least one of the sensor information, the signal, the depth, the azimuth, or the physical property in a visible format.

3. The method of claim 1, further comprising:
   determining the physical property based on values encoded in at least one of an amplitude component and a phase component of the signal.

4. The method of claim 1, further comprising:
   determining that a fluid is flooding a borehole in the geological formation based on the sensor information.

5. An apparatus, comprising:
   a wireline housing; and
   multiple pads that are attached to the wireline housing and in contact with a borehole wall, at least some of the pads comprising sensors coupled to a spiral-shaped optical fiber to provide, when operating, sensor information comprising a signal integrating at least a depth and an azimuth of one or more of the sensors along the spiral-shaped optical fiber, and a physical parameter measurement.

6. The apparatus of claim 5, further comprising at least one electromagnetic source attached to some of the pads, wherein at least some of the sensors comprise magnetic dipole sensors.

7. The apparatus of claim 5, further comprising at least one current injection source attached to some of the pads, wherein at least some of the sensors comprise voltage differential sensors.

8. The apparatus of claim 5, wherein the sensors comprise at least one of magnetic or electrical dipole sensors.

9. The apparatus of claim 5, further comprising a non-transitory machine-readable storage device comprising instructions stored thereon, which, when performed by a machine, causes the machine to:
determine a physical property of a material in a geological formation based on the physical parameter measurement; and
display a map of at least one of the sensor information, the signal, the depth, the azimuth, or the physical property in a visible format.

10. The apparatus of claim 5, further comprising a non-transitory machine-readable storage device comprising instructions stored thereon, which, when performed by a machine, causes the machine to:
determine a physical property of a material in a geological formation based on the physical parameter measurement; and
determine the physical property based on values encoded in at least one of an amplitude component and a phase component of the signal.

11. The apparatus of claim 5, further comprising a non-transitory machine-readable storage device comprising instructions stored thereon, which, when performed by a machine, causes the machine to:
determine a physical property of a material in a geological formation based on the physical parameter measurement; and
determine that a fluid is flooding a borehole in the geological formation based on the sensor information.

12. A logging-while-drilling system, comprising:
a drill bit:
a downhole tool comprising multiple pads, wherein at least one of the multiple pads comprises a cylindrical surface having a spiral-shaped groove, and wherein the downhole tool is attached to the drill bit; and
sensors coupled to an optical fiber disposed within the spiral-shaped groove to provide, when operating, sensor information comprising a signal integrating at least a location of one or more of the sensors along the optical fiber, and a physical parameter measurement.

13. The logging-while-drilling system of claim 12, further comprising at least one magnetic dipole transmitter attached to the drill collar.

14. The logging-while-drilling system of claim 12, wherein at least some of the sensors comprise magnetic dipole sensors.

15. The logging-while-drilling system of claim 12, further comprising an electric dipole transmitter attached to the drill collar, to apply, when operating, an alternating current to the drill collar to produce an alternating field at a gap in the drill collar.

16. The logging-while-drilling system of claim 12, wherein at least some of the sensors comprise electrical dipole sensors.

17. An apparatus, comprising:
a casing or cement in a borehole;
a wireline housing, wherein multiple pads are attached to the wireline housing and in contact with a wall of the casing or cement in the borehole; and
sensors coupled to an optical fiber, wherein the optical fiber is embedded in or attached to a respective pad of the multiple pads, and wherein the optical fiber comprises a spiral-shape to follow an azimuthal path around the respective pad of the multiple pads, wherein the sensors are to provide, when operating, sensor information comprising a signal integrating at least one of a depth and an azimuth of one or more of the sensors along the optical fiber, and a physical parameter measurement.

18. The apparatus of claim 17, wherein the physical parameter measurement comprises at least one of conductivity, resistivity, magnetic permeability, or dielectric constant.

19. The apparatus of claim 17, further comprising:
a memory to store a log of at least one of the sensor information, the signal, the depth, the azimuth, or the physical parameter measurement.

20. The apparatus of claim 17, further comprising:
a detection device to monitor the sensor information and to responsively provide an indication of fluid flooding in the borehole.

21. The apparatus of claim 20, wherein the detection device comprises a conductivity measurement device to predict a future occurrence of the fluid flooding.

22. The apparatus of claim 20, wherein the detection device is to provide a response signal to slow down or stop production from one or more perforations in the borehole.

* * * * *